United States Patent
Lammers et al.

(10) Patent No.: US 9,672,864 B2
(45) Date of Patent: Jun. 6, 2017

(54) CHANGING CHARACTERISTICS OF SIGNAL PATTERNS TO REDUCE ADJACENT TRACK INTERFERENCE

(71) Applicant: Seagate Technology LLC, Cupertino, CA (US)

(72) Inventors: Todd Michael Lammers, Lafayette, CO (US); Kaizhong Gao, North Oaks, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/879,214

(22) Filed: Oct. 9, 2015

(65) Prior Publication Data

US 2017/0103781 A1    Apr. 13, 2017

(51) Int. Cl.
| | | |
|---|---|---|
| *G11B 11/00* | (2006.01) | |
| *G11B 20/10* | (2006.01) | |
| *G11B 5/09* | (2006.01) | |
| *G11B 5/29* | (2006.01) | |
| *G11B 5/00* | (2006.01) | |
| *G11B 5/012* | (2006.01) | |
| *G11B 27/36* | (2006.01) | |

(52) U.S. Cl.
CPC .......... *G11B 20/10212* (2013.01); *G11B 5/09* (2013.01); *G11B 5/29* (2013.01); *G11B 5/012* (2013.01); *G11B 20/10009* (2013.01); *G11B 27/36* (2013.01); *G11B 2005/0021* (2013.01); *G11B 2220/20* (2013.01); *G11B 2220/90* (2013.01)

(58) Field of Classification Search
None
See application file for complete search history.

(56) References Cited

U.S. PATENT DOCUMENTS

| | | | | |
|---|---|---|---|---|
| 4,916,553 | A * | 4/1990 | Yoshioka | H04N 5/78266 360/70 |
| 6,826,003 | B1 | 11/2004 | Subrahmanyam | |
| 7,830,631 | B2 | 11/2010 | Nakagawa et al. | |
| 8,599,508 | B1 | 12/2013 | Burd | |
| 8,625,215 | B1 | 1/2014 | Burd et al. | |
| 8,861,114 | B1 * | 10/2014 | Burd | G11B 5/012 360/45 |
| 8,885,275 | B1 * | 11/2014 | Lou | G11B 20/10305 360/31 |
| 8,885,277 | B1 * | 11/2014 | Erden | G11B 20/1403 360/39 |
| 8,891,207 | B1 * | 11/2014 | Li | G11B 5/115 360/121 |
| 8,913,341 | B1 * | 12/2014 | Jury | G11B 20/10046 360/39 |
| 9,001,442 | B2 * | 4/2015 | Park | G11B 27/36 360/25 |
| 9,099,103 | B1 * | 8/2015 | Krichevsky | G11B 5/012 |
| 9,099,155 | B1 * | 8/2015 | Kataria | G11B 27/36 |

(Continued)

*Primary Examiner* — Tan X Dinh
(74) *Attorney, Agent, or Firm* — Hollingsworth Davis, LLC

(57) ABSTRACT

First and second signal patterns are used to write corresponding portions of first and second adjacent tracks to a magnetic storage medium. A characteristic of the first signal pattern is changed based on the second signal pattern, the changing of the characteristic reducing an adjacent track interference affecting the second track.

20 Claims, 3 Drawing Sheets

(56) References Cited

U.S. PATENT DOCUMENTS

| | | | |
|---|---|---|---|
| 9,129,628 B1* | 9/2015 | Fallone | G11B 5/012 |
| 9,245,578 B1* | 1/2016 | Wang | G11B 20/10018 |
| 9,275,656 B1* | 3/2016 | Contreras | G11B 5/02 |
| 9,373,349 B1* | 6/2016 | Erden | G11B 5/746 |
| 9,401,161 B1* | 7/2016 | Jury | G11B 5/3974 |
| 9,570,104 B1* | 2/2017 | Erden | G11B 20/10009 |
| 2012/0019947 A1* | 1/2012 | Kuehlwein | G11B 5/02 360/46 |
| 2014/0126077 A1 | 5/2014 | Contreras et al. | |
| 2014/0139940 A1* | 5/2014 | Ong | G11B 5/012 360/39 |

* cited by examiner

CHANGING CHARACTERISTICS OF SIGNAL PATTERNS TO REDUCE ADJACENT TRACK INTERFERENCE

SUMMARY

The present disclosure is related to changing characteristics of signal patterns to reduce adjacent track interference. In one embodiment, first and second signal patterns are used to write corresponding portions of first and second adjacent tracks to a magnetic storage medium. A characteristic of the first signal pattern is changed based on the second signal pattern, the changing of the characteristic reducing an adjacent track interference affecting the second track.

These and other features and aspects of various embodiments may be understood in view of the following detailed discussion and accompanying drawings.

BRIEF DESCRIPTION OF THE DRAWINGS

In the following diagrams, the same reference numbers may be used to identify similar/same/analogous components in multiple figures. The figures are not necessarily to scale.

DETAILED DESCRIPTION

The present disclosure is related to systems, methods, and apparatuses utilizing magnetic recording media, e.g., hard disks. One advantage hard disk drives have over other data storage technologies (such as flash memory) is a relatively low cost-per-unit-of-storage. The low storage cost of hard drive has been achieved by, among other things, increasing the areal density of magnetic devices at a rate of about 10-15% over the last decade. This allows a disk drive device to increase total capacity without a significant increase in physical size or cost.

In order to maintain the growth of hard disk drive areal density, a number of new recording and reading technologies are proposed. For example, shingled magnetic recording (SMR) utilizes existing perpendicular magnetic recording technologies to write overlapping tracks, resulting in a narrower tracks and higher track density. A technology known as two-dimensional magnetic recording (TDMR) allows reading two or more tracks at the same time, e.g., decoding a combination of the two tracks. Another technology known as multiple-sensor magnetic recording (MSMR), etc., utilizes multiple sensors per read/write head. A MSMR head can have multiple readers that read data from one or more tracks simultaneously, potentially increasing performance for tracks written at a narrow pitch.

Other magnetic recording technologies are being developed to address what is known as the paramagnetic limit, which limits the theoretical areal density of existing perpendicular recording. Examples of these technologies include heat-assisted magnetic recording (HAMR) and bit-patterned media (BPM). A HAMR recording device uses an energy source such as a laser to heat a spot on a high-coercivity medium to locally reduce coercivity during recording. After the spot has cooled, the data is less susceptible to data loss due to thermal fluctuations. A BPM device has a media that is patterned via nanolithography to form magnetic cells used to store bits of data. The use of nanolithography allows for greater areal density than if the cells were defined in a continuous medium by a write transducer.

Whether areal density is increased using MSMR, SMR, HAMR, BPM or any combination thereof, writing narrower tracks may present challenges. Not only are the written tracks narrower, but the spacing between tracks may be reduced. As such, adjacent track interference (ATI) will be a concern in such systems. As will be described below, one way of reducing the effects of ATI is to tailor the patterns of the written data to reduce the effect of one track on the other.

Figure 1:
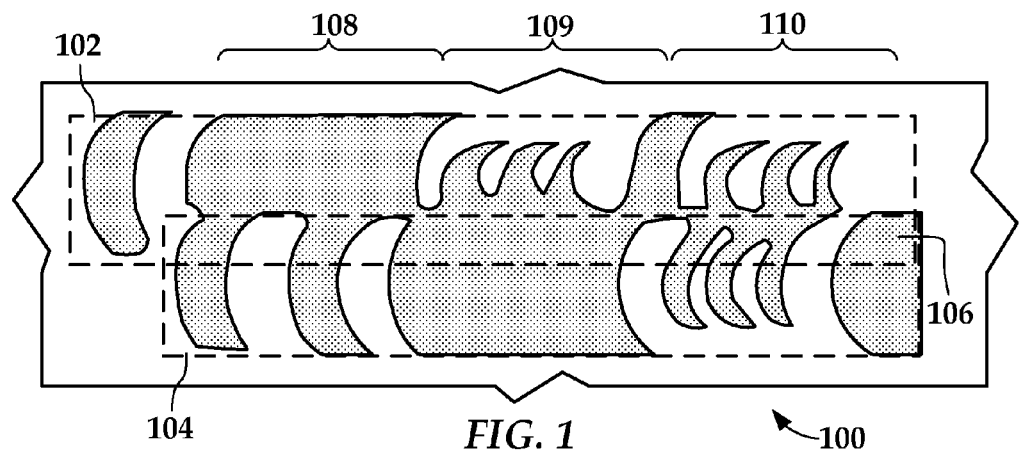
FIG. 1 is a block diagram illustrating data tracks according to an example embodiment.

In reference now to FIG. 1, a block diagram illustrates an example of tracks 102, 104 on a recording medium 100 according to an example embodiment. In this example, the tracks 102, 104 were written using SMR, the different shading representing different magnetic orientations of the medium 100. In this example, track 102 is the first written track, and track 104 is written second, overlapping the first track 102 by region 106, the region 106 being referred to herein as an erase band.

The adjacent tracks 102 and 104 are divided into three corresponding downtrack regions 108-110 to illustrate the effects that writing the second track 104 can have on the first track. In region 109, a long transition for the second track 106 is aligned with shorter transitions on the first track. This can tend to distort the shorter transitions, e.g., when compared to similar transitions in region 110 on the first track 102. In embodiments described below, prior knowledge of previously written adjacent track data (or adjacent track data to be written in the future) can be used to modify writing of a track to reduce interference affecting the adjacent track, and vice versa.

In the SMR example shown in FIG. 1, prior knowledge of data to be written on track N+1 can be used to adjust/modify the write current used on any bit on track N. This adjustment may include changing waveform asymmetry (e.g., difference between negative and positive peaks relative to zero), peak current, rise time, total current, overshoot, or any other parameter to counteract erase band signatures, decrease curvature, increase saturation, and decrease transition noise. The recording of track N+1 (e.g., at the end of a band of overlapping SMR tracks) could also be recorded with the knowledge of adjacent track contents. For example, a "buffer" holding contents of next track (N+1) to perform adjustments on track N. The method may rely on bit-level alignment between adjacent tracks, average energy detection within each symbol, and/or read look-ahead to ensure the modified track signal has the desired effect on the adjacent track.

In one example, the track signal can be modified in cases where short transitions on one track are recorded next to long transitions on the adjacent track, which exhibits erase band effects (e.g., transition curvature, or transition noise) that is not seen when short transitions are recorded adjacent to short transitions. Each written bit has a demagnetization field extending to the neighboring bits, in both down-track and cross-track directions. Additionally the erase band may be dependent on polarity of the bits and perhaps exacerbated by the length of bits. For example, the shape of a bit region written one magnetic polarity may differ for the same bit written with the opposite polarity.

In some embodiments, knowing the previously written bits on an adjacent track can be used to apply pre-compensation when writing the existing track to reduce interference at the adjacent track. The same approach can be adjust the current track bits to ensure good overwrite for the next track. For example, if the adjacent track is likely to have strong demagnetization, the write parameters (e.g., overshoot) can be adjusted such that applied magnetic field can more effectively affect the media demagnetization. This will reduce transition shifts, which may result in jitter when trying to detect the data sectors. The media demagnetization field is on order of a few hundreds of Oes, from neighboring bits. With this knowledge, an apparatus according to various embodiments can provide accurate compensation for adjacent track interference effects.

If adjacent tracks are to be read together via a two-dimensional data encoding channel and/or multiple-sensor magnetic reader, specific patterns and write current profiles can be optimized to achieve even higher areal density. The method could be extended to prepare writes for encoding TDMR/MSMR data. In some cases, this method could be used to improve pole tip degauss and decrease erase after write (EAW). A method to confirm crosstrack alignment and subsequent wave-shaping can be used to avoid destructive alignments.

In existing SMR, TDMR, MSMR systems, adjacent tracks are recorded without knowledge of the data pattern on the adjacent track(s). If the adjacent track(s) data pattern can be known prior to writing the track of interest, the write current for the data pattern of the track of interest can be adjusted such that the recording field does not disturb (or better yet enhances) the data pattern on the adjacent tracks, the adjacent track having been written before or after the track of interest. Additionally, the track of interest could be recorded with greater fidelity and achieve better signal-to-noise ratio if the write current could be adjusted using the knowledge of the recorded pattern surrounding it. In this way, erase bands can be mitigated and both tracks-per-inch (track density) and bits-per-inch (linear bit density) can be increased resulting in a net areal density increase. The techniques described below utilize memory/knowledge (e.g., a buffer) of adjacent track, and can modify the write current for any transition in a pattern no matter its bit length to help the erase band and/or adjacent track integrity.

Figure 2:
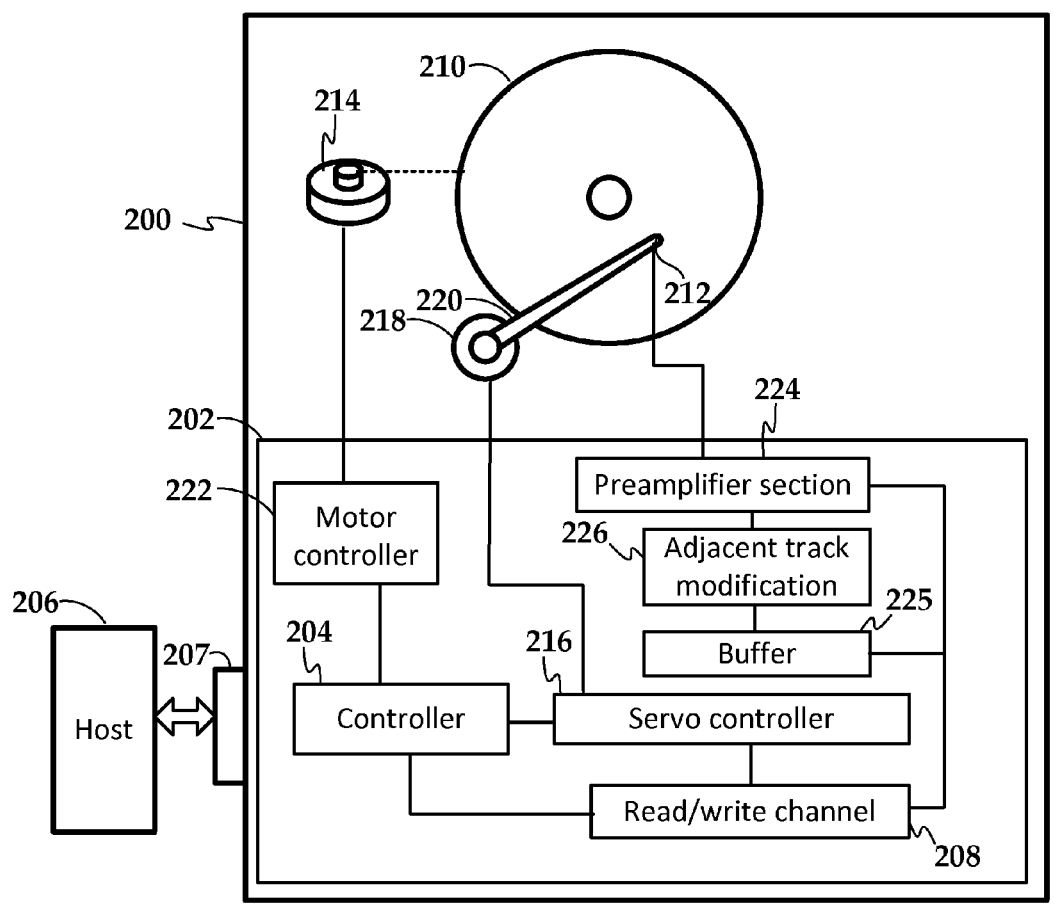
FIG. 2 is a block diagram of an apparatus according to an example embodiment.

In reference now to FIG. 2, a block diagram illustrates components of a hard drive apparatus 200 according to an example embodiment. The apparatus 200 includes circuitry 202 that facilitates reading from and writing to a recording medium, e.g., one or more magnetic disks 210. The circuitry 202 includes a controller 204 that facilitates, among other things, communication with a host device 206 via a host interface 207. The host device 206 may include any electronic device that can be communicatively coupled to communicate with the circuitry 202, e.g., a general-purpose computer, a factory test bench, etc.

The controller 204 may include any combination of custom logic circuits, application specific integrated circuits (ASICs), general-purpose central processing unit (CPU), interface circuits, and may utilize instructions stored as firmware and/or software. The controller 204 communicates with one or more read/write heads 212 via a read/write channel 208. The controller 204 may, among other things, determine a location on the disk 210 for data to be stored or retrieved, move the read/write heads 212 to the location (track) of the data, read or write the data via the read/write channel 208, correct errors, transfer the data to/from the host 206, etc.

The read/write channel 208 converts data between the digital signals processed by the data controller 204 and the analog signals conducted through read/write heads 212. The read/write channel 208 also provides servo data read from the disk 210 to a servo controller 216. The servo controller 216 uses these signals to drive an actuator 218 (e.g., voice coil motor) that rotates an arm 220, upon which the read/write heads 212 are mounted. The heads 212 are moved radially across different tracks of the disk(s) 210 by the actuator motor 218 (e.g., voice coil motor), while a spindle motor 214 rotates the disk(s) 210. The controller 204 controls the spindle motor 214 by way of a motor controller 222.

During write operations, the read/write channel 208 provides analog signals that are delivered to the read/write heads 212 by way of a preamplifier section 224. The preamplifier section 224 amplifies and conditions the write signals sent to write coils of the read/write heads 212. In order to reduce destructive interactions between adjacent tracks, a buffer 225 may be used to temporarily store adjacent track data from tracks that already have been written and/or that will be written. Generally, the data stored in the buffer 225 may be encoded in the format that will be sent to the read/write heads 212 via the preamplifier section 224. The data stored in the buffer 225 may be provided by the read/write channel 208, or in some instances (e.g., when read-ahead is used) may be provided from the read/write heads 212.

An adjacent track modification module 226 analyzes the makeup of signals that will write data portions that are aligned between adjacent tracks. The adjacent track modification module 226 provides a write compensation signal to the preamplifier section 224 that changes a characteristic of a signal pattern used to write data of at least one of the adjacent tracks. The change to the signal pattern may be accomplished by summing a compensation signal with the data signal, and/or by modifying digital inputs that define written signal levels, e.g., levels input to an analog-to-digital converter, control lines input to a preamplifier, etc.

The illustrated hard disk apparatus 200 may be capable of HAMR recording, in which case the preamplifier section 224 may include circuitry that energizes a laser (or other energy source) at each of the read/write heads 212 during write operations. The laser circuitry conditions the signals to ensure the lasers provide sufficient energy to heat a spot on the disk 210 as it is being recorded. In such a case, the buffer 225 and adjacent track modification module 226 may be used to modify laser signals sent to the read/write heads 212 instead of or in addition to write coil signals sent to the read/write heads 212. For example, reducing laser power may cause track data to be written with a narrower cross-track profile, even if no change is made to the writer signal. This is because the hotspot created by the laser defines the size of the recorded bits. Regions outside the hotspot have high magnetic coercivity at ambient temperature, and so even if the magnetic field produced by the writer extends to these unheated regions, the magnetic orientation will not be changed.

Figure 3:
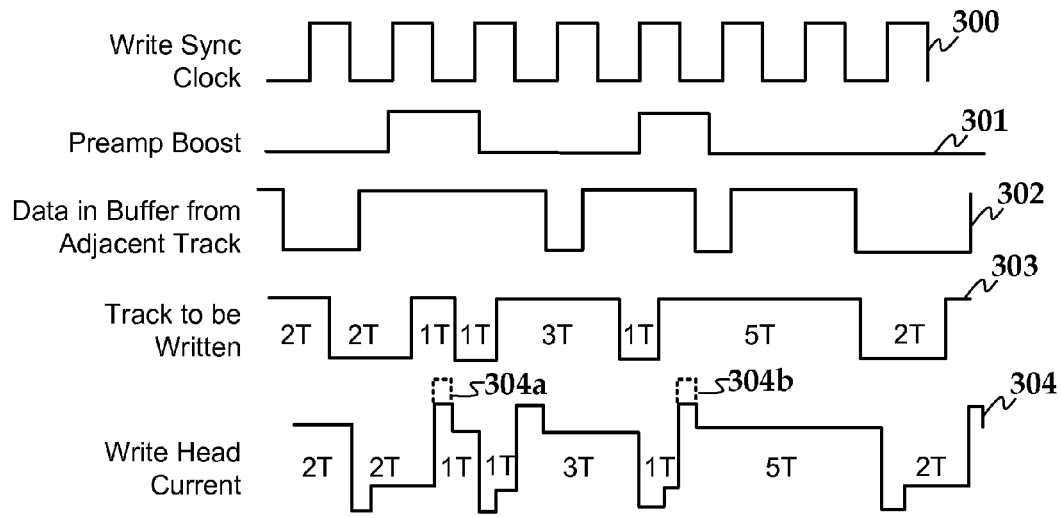
FIGS. 3 and 4 are signal timing diagrams illustrating compensation signals according to example embodiments.

In reference now to FIG. 3, a timing diagram illustrates how adjacent track modification may be performed according to an example embodiment. Trace 300 represents the output of a clock used to synchronize write operations, e.g., a 1T square wave. Trace 301 represents a preamplifier boost signal, the operation of which will be discussed further below. Trace 302 represents a data buffer with a signal pattern from an adjacent track, which could either be a previously written track or a next written track. Trace 303 represents a signal pattern of a track to be written, and trace 304 represents a signal pattern of current as applied to the write head. Note that, compared to track 303, the trace 304 includes additional features (e.g., overshoot at the transitions) that may be applied by the preamplifier and/or may a result of the channel between the preamplifier and the write head.

As indicated by dotted lines, the preamplifier boost signal 301 results in the overshoot in regions 304a-b to be increased. The boost signal 301 may, for example, activate a control line that causes an overshoot setting of the preamplifier to be temporarily increased for the indicated positive transitions. In other cases, the boost signal 301 may be summed with the signal pattern 303. A logic circuit and/or algorithm may monitor the waveforms shown in traces 302 and 303, and create the digital boost signal 301 in response to conditions where adjacent track interference may reduce performance. Other characteristics of the signal pattern 304 besides overshoot may be similarly changed, e.g., peak level, waveform symmetry, timing, etc. In other embodiments, multiple boost signals may be used, e.g., one for overshoot, one for rise time, etc. These signals may be independently activated based on adjacent features of signal patterns 302 and 303 that could lead to data errors from adjacent track interference if not mitigated by modification of at least signal 304.

Figure 4:
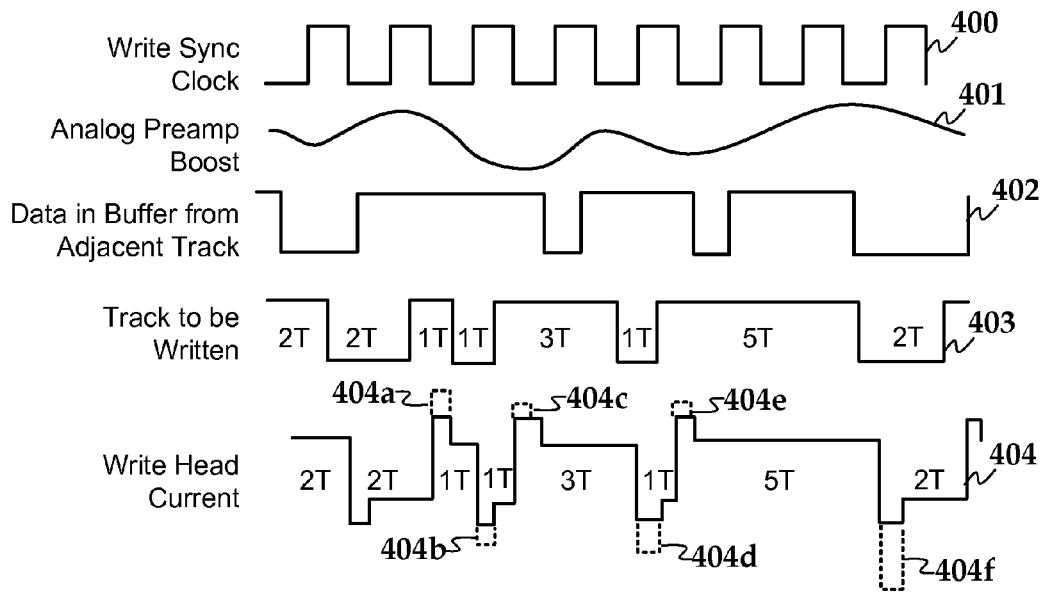

In FIG. 4, a timing diagram illustrates how adjacent track modification may be performed according to another example embodiment. Traces 400, 402-403 are similar to traces 300, 302-303, respectively, in FIG. 3. In FIG. 4, trace 401 is an analog boost signal, which results in the changes 404a-f shown in dotted line (e.g., being added to the signal 403). The analog boost signal 401 may be obtained similarly to the boost signal 301 shown in FIG. 3, e.g., based on a logic circuit and/or algorithm that monitors signals 402 and 403 and creates a compensation signal in response. In other embodiments, the analog boost signal 401 may be measured, e.g., by a read transducer that is located over or near an adjacent track while the current track is being written. In such a case, analog signal processing may be applied (e.g., filtering, delaying) either using analog circuitry or performing analog-to-digital conversion and then applying processing to the digital signal.

It will be understood that boost signals may be applied to a laser control signal of a heat-assisted recording medium similar to the boost signals shown in FIGS. 3 and 4. Such a laser boost signal changes (increases or decreases) a laser power of a heat-assisted recording head that is used to record the signal patterns, e.g., signals 304 and 404. The changing of the laser power reduces the adjacent track interference affecting one or both of the currently written track and an adjacent track. The laser boost may be applied together with the write coil boost shown in FIGS. 3 and 4, or by itself.

Figure 5:
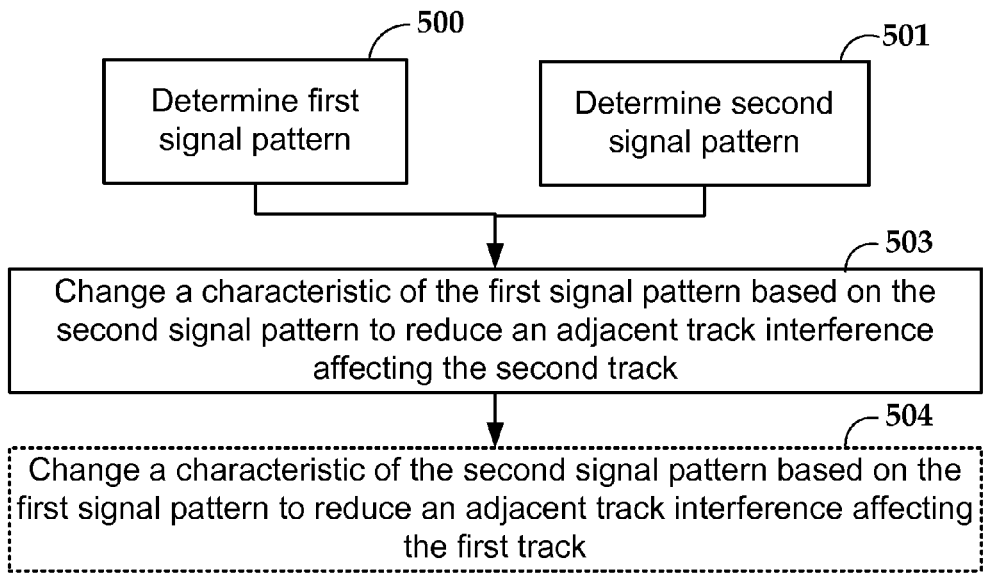
FIG. 5 is a flowchart illustrating a method according to an example embodiment.

In reference now to FIG. 5, a flowchart illustrates a method according to an example embodiment. The method involves determining 501, 502 first and second signal patterns used to write corresponding portions of first and second adjacent tracks to a magnetic storage medium. One of both of the determinations 501, 502 may be made by an encoder that converts data to signal patterns used to write the data to the storage medium, and other sources may be used at least for part of the determinations 501, 502, e.g., read-ahead signal. The method further involves changing 503 a characteristic of the first signal pattern based on the second signal pattern, which reduces an adjacent track interference affecting the second track. For example, overshoot, rise time, asymmetry, peak value, timing, etc., may be increased or decreased for a portion of the first signal pattern.

Optionally, a characteristic of the second signal pattern may be changed 504 based on the first signal pattern, the changing of the characteristic reducing an adjacent track interference affecting the first track. For example, the first track may also be the first written, and so some characteristics of the first signal pattern is changed 503 to allow the second track to more easily erase portions, e.g., high frequency portions. Thereafter, the second signal pattern can also be changed 504 to prevent other types of interference when the second track is written.

Figure 6:
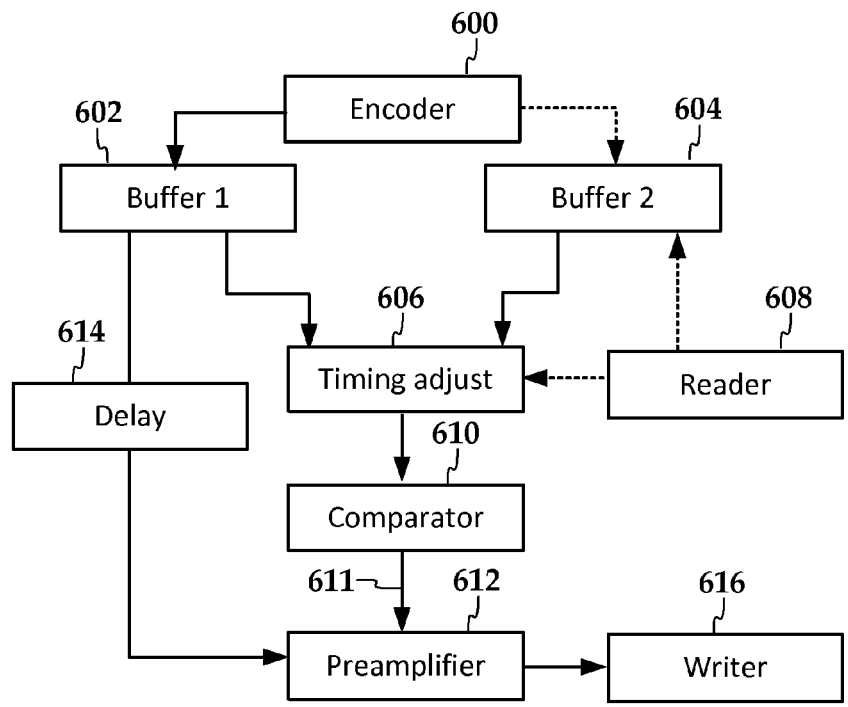
FIG. 6 is a functional block diagram showing aspects of an adjacent track modification module according to an example embodiment.

In FIG. 6, a functional block diagram shows aspects of an adjacent track modification module according to an example embodiment. An encoder 600 prepares incoming data streams (e.g., host storage requests) to an electronic signal suitable for transmission through a recording channel to energize a writer that records data to a magnetic recording medium. An output of the encoder is put in a first buffer 602, which temporarily stores data used to form a signal for a first track that is the next to be written.

A second buffer 604 stores data of a second track adjacent to the first that has been written before the first track or will be written after the first track. The data for the second buffer 604 may come from the encoder 600 as well, or from another source, as indicated by reader 608. Where the data from the first and second track both come from the encoder 600, a single buffer may be used to store both sets of signal data, e.g., a circular buffer that holds data of two or more tracks. A timing adjust module 606 predicts the physical alignment between the first and second tracks on the disk, and makes the appropriate adjustment to the first and second signals so that the subsequent analysis can predict corresponding regions of the adjacent tracks (e.g., regions that are cross-track adjacent to each other) after they have been written. The reader 608 may also provide inputs to the timing module, e.g., read-ahead data from adjacent track.

A comparator 610 compares sections of the adjacent track and looks for situations that might lead to performance loss due to adjacent track interference. For example, a segment of N-single bit transitions (1T) adjacent to a relatively long transitions, e.g., MT, where M>4, may signal the need for compensation when recording the first track. There need not be any limit on the length of the segment, which may, for example, encompass an entire track. In some cases it might be desirable to use smaller segments, e.g., corresponding to a full data sector. The output 611 of the comparator 610 is an adjustment/compensation signal (e.g., boost, attenuate) input to a preamplifier 612, that further conditions the signals before they are sent to a writer 616 to perform recording. Note that the computations performed by the comparator 610 and other modules will take some amount of time, and so a delay element 614 may be provided to align the first signal provided from the first buffer 602 with the adjustment signal 611 as both are processed by the preamplifier 612. In other configurations, the delay element 614 may be placed between the encoder 600 and preamplifier 612, or the synchronization between the first track signal and the adjusted signal 611 may be provided by some other means.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. A method comprising:
   determining first and second signal patterns used to write corresponding portions of first and second adjacent tracks to a storage medium, the first and second signal patterns resulting in an alignment of short and long transitions between the first and second adjacent tracks; and
   changing a preamplifier boost used to write the short transitions to reduce an adjacent track interference caused by the alignment of the long and short transitions when writing the first and second tracks.

2. The method of claim 1, wherein the first track is written before the second track, and wherein the determining of the second signal pattern comprises buffering the second signal pattern before writing the second track.

3. The method of claim 1, wherein the second track is written before the first track.

4. The method of claim 1, wherein the second signal pattern comprises a read-ahead signal of the second track obtained via a reader from the storage medium.

5. The method of claim 1, wherein the first track and second tracks are bit-level aligned.

6. The method of claim 1, wherein changing of the preamplifier boost comprises changing one or more of an overshoot of a signal used to write the short transitions, an asymmetry of the signal, and a rise time of the signal.

7. The method of claim 1, wherein the first and second adjacent tracks are shingled tracks.

8. The method of claim 1, wherein the first and second tracks are read together via a multiple sensor magnetic reader.

9. The method of claim 1, wherein the first and second tracks are read together via a two-dimensional recording channel.

10. The method of claim 1, further comprising changing a laser power of a heat-assisted recording head used to record at least one of the long and short transitions, the changing of the laser power reducing the adjacent track interference.

11. An apparatus comprising:
    a preamplifier section configured to write data to a magnetic storage medium; and
    a controller configured to:
        determine first and second signal patterns used to write corresponding portions of first and second adjacent tracks to the magnetic storage medium, the first and second signal patterns resulting in an alignment of short and long transitions between the first and second adjacent tracks; and
        change a preamplifier boost used to write the short transitions to reduce an adjacent track interference caused by the alignment of the long and short transitions when writing the first and second tracks.

12. The apparatus of claim 11, wherein the first track is written before the second track, and wherein the determining of the second signal pattern comprises buffering the second signal pattern before writing the second track.

13. The apparatus of claim 11, wherein the second track is written before the first track.

14. The apparatus of claim 11, wherein the first track and second tracks are bit-level aligned.

15. The apparatus of claim 11, wherein changing of the preamplifier boost comprises changing one or more of an overshoot of a signal used to write the short transitions, an asymmetry of the signal, and a rise time of the signal.

16. The apparatus of claim 11, wherein the first and second adjacent tracks are shingled tracks.

17. The apparatus of claim 11, wherein the first and second tracks are read together via at least one of a multiple sensor magnetic recording reader and a two-dimensional magnetic recording channel.

18. A method comprising:
    buffering, via a read/write channel, first and second signal patterns used to write first and second adjacent tracks on a storage medium;
    determining, from the buffering, corresponding regions of the first and second signal patterns that will result in an alignment of short and long transitions between the first and second adjacent tracks, the alignment causing adjacent track interference that affects at least the second track; and
    changing, via the read/write channel, a preamplifier boost when writing the corresponding region of the first signal pattern to reduce the adjacent track interference.

19. The method of claim 18, wherein changing the preamplifier boost of the corresponding region of the first signal pattern to reduce the adjacent track interference comprises applying a digital boost signal to alter a setting of a preamplifier when writing the first signal pattern.

20. The method of claim 18, wherein changing the preamplifier boost of the corresponding region of the first signal pattern to reduce the adjacent track interference comprises adding an analog boost signal to the first signal pattern via a preamplifier when writing the first signal pattern.

* * * * *